United States Patent [19]
Karube

[11] Patent Number: 5,359,579
[45] Date of Patent: Oct. 25, 1994

[54] MAGNETO-OPTICAL RECORDING METHOD AND MEDIUM FOR RECORDING THREE-VALUE INFORMATION

[75] Inventor: Hiroo Karube, Tokyo, Japan

[73] Assignee: NEC Corporation, Tokyo, Japan

[21] Appl. No.: 89,547

[22] Filed: Jul. 12, 1993

[30] Foreign Application Priority Data

Jul. 10, 1992 [JP] Japan .................. 4-183277

[51] Int. Cl.⁵ ............................ G11B 13/04
[52] U.S. Cl. ........................ 369/13; 369/275.2; 369/110
[58] Field of Search ............ 369/13, 14, 110, 275.2, 369/275.4, 273, 275.5; 360/59, 114; 365/122; 428/694 ML, 694 MM, 694 EC

[56] References Cited

U.S. PATENT DOCUMENTS

| | | | |
|---|---|---|---|
| 4,932,012 | 6/1990 | Kobayashi | 369/13 |
| 5,105,400 | 4/1992 | Kikitsu et al. | 369/13 |
| 5,175,714 | 12/1992 | Kikitsu et al. | 369/13 |
| 5,202,880 | 4/1993 | Lee et al. | 369/275.2 |
| 5,210,724 | 5/1993 | Kobayashi | 369/13 |
| 5,282,095 | 1/1994 | Spruit et al. | 369/13 |

FOREIGN PATENT DOCUMENTS 4-10256  1/1992  Japan .

OTHER PUBLICATIONS

N. Saito et al., "Multi-Valued Magneto-Optical Recording in TbFe/SiO Compositionally Modulated Films", Digests of the 13th Annual Conference on Magnetics in Japan, 1989, p. 63.

*Primary Examiner*—Robert J. Pascal
*Assistant Examiner*—Tan Dinh
*Attorney, Agent, or Firm*—Sughrue, Mion, Zinn, Macpeak & Seas

[57] ABSTRACT

A magneto-optical recording medium which allows overwriting of three-value information and sufficiently satisfies read/write requirements necessary for practical use and a magneto-optical recording method which allows writing and reading out of three-value information readily with a high degree of accuracy are disclosed. In an initial condition, first and second recording films are magnetized in a same initial direction, and the first recording film has a threshold value for a recording magnetic field, which is a minimum magnetic field necessary to reverse the magnetization direction, lower by a predetermined amount than the threshold value of the second recording film. By selecting the magnitude and the direction of a magnetic field to be applied, three-value recording among the initial condition wherein both of the first and second recording films are magnetized in the initial direction, a first condition wherein only the first recording film is magnetized in the direction opposite to the initial direction, and a second condition wherein the first and second recording films are magnetized in the opposite direction can be realized for each pit.

2 Claims, 5 Drawing Sheets

MAGNETO-OPTICAL RECORDING METHOD AND MEDIUM FOR RECORDING THREE-VALUE INFORMATION

BACKGROUND OF THE INVENTION

1. Field of the Invention

This invention relates to a magneto-optical recording medium on which three-value information can be recorded at a recording pit and a magneto-optical recording medium by which three-value information can be recorded at a recording pit.

2. Description of the Related Art

Magneto-optical recording disks have been placed on the market already as removable recording media which have a large storage capacity and can be accessed at random. Existing magneto-optical recording disks, however, have a single recording film, and only two-value information is recorded on them by magnetizing the signal recording film in a first direction or a second direction opposite to the first direction. While some existing magneto-optical recording disks have two recording films formed thereon, such two recording films are provided in order to assure a high sensitivity or allow overwriting, but do not allow recording of multi-value information equal to or higher than three values.

It has been reported, as a technique of recording multi-value information, in Digests of the 13th annual conference on Magnetics in Japan, 1989, p. 63, that recording of multi-value information is possible by a difference in coercive force among three TbFe layers. This, however, merely indicates in principle that recording of multi-value information is possible by a difference in coercive force, but no investigations have been made for read/write requirements for a magneto-optical recording disk, particularly for the read possibility. Even if multi-value information can be read, in order to record multi-value information, a magnetic field sufficient to overcome the coercive force of a magnetic material itself must be applied, and it is technically difficult to change over such a high magnetic field at a high rate. However, if the change-over rate is made low in order to change over the magnetic field readily, the recording density is decreased. Consequently, even if multi-value information is recorded, enhancement of the recording density cannot be anticipated.

A three-value recording method has been proposed in Japanese Patent Laid-Open Application No. Heisei 4-10256 wherein first and second recording films having different threshold levels for recording laser irradiation power are layered and the intensity of laser irradiation power to be irradiated is modulated to achieve recording of three-value information. The three-value recording method, however, is disadvantageous in that, since overwriting is impossible, a long time is required for writing of information.

SUMMARY OF THE INVENTION

It is an object of the present invention to provide a magneto-optical recording medium which allows overwriting of three-value information.

It is another object of the present invention to provide a magneto-optical recording medium which sufficiently satisfies read/write requirements necessary for practical use.

It is a further object of the present invention by which three-value information can be written and read out readily with a high degree of accuracy.

In order to attain the objects described above, according to an aspect of the present invention, there is provided a magneto-optical recording medium, which comprises a first transparent recording film in the form of a perpendicular magnetization layer, a second transparent recording film in the form of a perpendicular magnetization layer, a transparent dielectric film formed between the first and second recording films, and a substrate having the first recording film, the dielectric film and the second recording film formed in layers on an outer face thereof, the first and second recording films being magnetized in a same initial magnetization direction in an initial condition of the magneto-optical recording medium, the first recording film having a first threshold value for a recording magnetic field, which is a minimum magnetic field necessary to reverse the direction of magnetization, lower by a predetermined amount or more than a second threshold value for a recording magnetic field of the second recording film, the first and second recording films being magnetized such that, while light of a particular power is irradiated upon the magneto-optical recording medium, when a magnetic field higher than the second threshold value is applied in the same direction as the initial magnetization direction, both of the first and second recording films are magnetized in the same direction as the initial magnetization direction, when a magnetic field hither than the first threshold value but lower than the second threshold value is applied in the direction opposite to the initial magnetization direction, only the first recording film is magnetized in the direction opposite to the initial magnetization direction, and when a magnetic field higher than the second threshold value is applied in the direction opposite to the initial magnetization direction, the first and second recording films are magnetized in the direction opposite to the initial magnetization direction.

Preferably, the difference between the first and second threshold values is 100 oersted or more, the thickness of each of the first and second recording films is greater than or equal to 50 angstrom but smaller than or equal to 400 angstrom, and the thickness of the transparent dielectric film is greater than or equal to 50 angstrom but smaller than or equal to 500 angstrom.

Preferably, the first recording film is formed from three elements of Tb, Fe and Co as principal components, and the second recording film is formed from four elements of Gd, Tb, Fe and Co as principal components.

Preferably, the second film is formed from a first layer made of three elements of Gd, Fe and Co or four elements of Gd, Fe, Co and Tb as principal components and having a thickness greater than or equal to 50 angstrom but smaller than or equal to 200 angstrom, and a second layer made of three elements of Tb, Fe and Co as principal components and having a thickness greater than or equal to 100 angstrom but smaller than or equal to 350 angstrom.

According to another aspect of the present invention, there is provided a magneto-optical recording method for recording information onto a magneto-optical recording medium which includes first and second transparent recording films in the form of perpendicular magnetization layers layered with each other with a transparent dielectric film interposed therebetween, the first and second recording films being magnetized in a same initial magnetization direction in an initial condition of the magneto-optical recording medium, the first recording film having a first threshold value for a recording magnetic field, which is a minimum magnetic field necessary to reverse the direction of magnetization, lower by a predetermined amount or more than a second threshold value of the second recording film, which comprises the steps of irradiating light of a particular power upon the magneto-optical recording medium, and applying, while such irradiation continues, a magnetic field to the magneto-optical recording medium to effect recording of three-value information such that, when the magnetic field is higher than the second threshold value and is applied in the same direction as the initial magnetization direction, the magneto-optical recording medium is magnetized in the initial condition wherein both of the first and second recording films are magnetized in the same direction as the initial magnetization direction, when the magnetic field is hither than the first threshold value but lower than the second threshold value and is applied in the direction opposite to the initial magnetization direction, the magneto-optical recording medium is magnetized in a first condition wherein only the first recording film is magnetized in the direction opposite to the initial magnetization direction, and when the magnetic field is higher than the second threshold value and is applied in the direction opposite to the initial magnetization direction, the magneto-optical recording medium is magnetized in a second condition wherein the first and second recording films are magnetized in the direction opposite to the initial magnetization direction.

With the magneto-optical recording medium and the magneto-optical recording method, by selecting the magnitude of a magnetic field to be applied and the application direction of the magnetic field, three-value recording among the initial condition wherein both of the first and second recording films are magnetized in the same direction as the initial magnetization direction, the first condition wherein only the first recording film is magnetized in the direction opposite to the initial magnetization direction and the second condition wherein the first and second recording films are magnetized in the direction opposite to the initial magnetization direction can be realized. Besides, since changeover among the three conditions can be performed with certainty by merely changing over the intensity of the magnetic field to be applied between the high intensity and the low intensity and selecting the magnetization direction of the magnetic field between the directions same as and opposite to the initial magnetization direction, overwriting is permitted. Besides, not only read/write requirements necessary for practical use can be satisfied, but also writing of three values can be performed readily with a high degree of accuracy.

Furthermore, upon reading the thus recorded three-value information, the three conditions described above can be read out separately as information of three values by setting slice levels corresponding to the magnitudes of Kerr rotation angles in the three conditions, and accordingly, reading of the three-value information can be performed readily with certainty.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
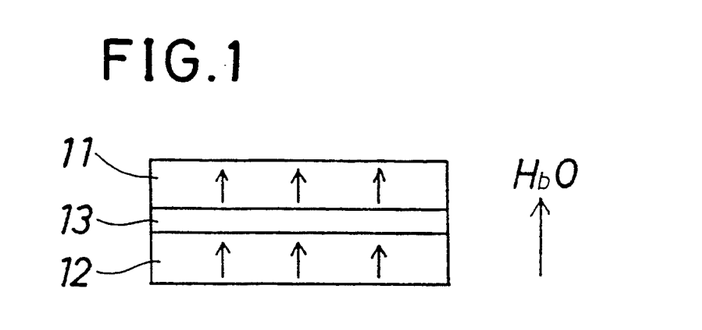
FIG. 1 is a schematic view showing a basic construction of a magneto-optical recording medium according to the present invention together with magnetization directions in an initial condition.

Referring first to FIG. 1, there is shown a basic structure of a magneto-optical recording medium according to the present invention. The magneto-optical recording medium includes a first recording film 11 and a second recording film 12 each in the form of a perpendicular magnetization layer formed on a substrate not shown, and a transparent dielectric film 13 interposed between the first and second recording films 11 and 12. The first and second recording films 11 and 12 are magnetized, when in an initial condition, in the same magnetization direction as indicated by arrow marks in FIG. 1. The first recording film 11 has a threshold value SH1 for a recording magnetic field higher by a predetermined amount or more than another threshold value SH2 for a recording magnetic field of the second recording film 12. Information can be recorded on the two recording films 11 and 12 in the following three recorded conditions when they are illuminated by light of the same power.

1. When a magnetic field Hb0 higher than the threshold value SH2 is applied in the same direction as the initial magnetization direction, the first and second recording films 11 and 12 are both magnetized in the same direction as the initial magnetization direction as seen in FIG. 1.

Figure 2:
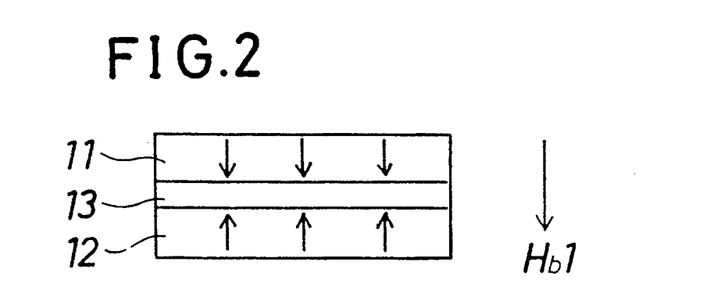
FIGS. 2 and 3 are similar views but illustrating magnetization directions in first and second recorded conditions of the magneto-optical recording medium, respectively.

2. When another magnetic field Hb1 higher than the threshold value SH1 but lower than the threshold value SH2 is applied in the direction opposite to the initial magnetization direction, the magnetization direction only of the first recording film 11 is reversed from the initial magnetization direction as seen from FIG. 2.

Figure 3:
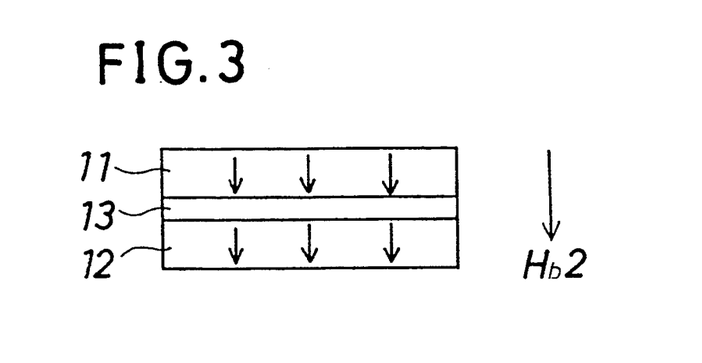

3. When a further magnetic field Hb2 higher than the threshold value SH2 is applied in the direction opposite to the initial magnetization direction, the directions of both of the first and second recording films 11 and 12 are reversed from the initial magnetization direction as seen from FIG. 3.

The difference between the threshold values SH1 and SH2 is set equal to or greater than 100 oersted taking the reliability of writing and reading out of three-value information. Furthermore, from the following reason, preferably the thickness of each of the first and second recording films 11 and 12 is set higher than or equal to 50 but lower than or equal to 400 angstrom, and the thickness of the transparent dielectric film is set higher than or equal to 50 but lower than or equal to 500 angstrom.

In order to read out the thus recorded information, a polarized laser beam is irradiated upon the magneto-optical recording medium from the substrate side, and the variation of the polarization plane angle for reflected light by Kerr effect is detected. In this instance, since the laser beam must come upon the two recording films, if the first recording film 11 is located nearer to the substrate, then the first recording film 11 must pass the laser beam therethrough, and therefore, the maximum value of the thickness of the first recording film 11 is about 400 angstrom. Furthermore, in order to obtain a high read signal, the Kerr rotation angle must be great. To this end, it is effective to reflect the light having passed through the recording films 11 and 12 by means of a reflection film to cause multiple interference of the light, and for this purpose, also the thickness of the second recording film 12 must be thin. Also the upper limit of the thickness is about 400 angstrom. On the other hand, the two magnetic recording films 11 and 12 must be perpendicular magnetization films. However, as the thickness of a magnetic recording film decreases, the magnetic recording film changes from a perpendicular magnetization film to an in-plane magnetization film. The lower limit of the thickness here is about 50 angstrom.

Subsequently, the thickness of the transparent dielectric film 13 will be described. If no dielectric film is interposed between the first and second recording films 11 and 12, then the two recording films are magnetically coupled to each other so that the magnetic characteristics of them are varied significantly to make three-value recording difficult or impossible. Further, since the dielectric film 13 must pass light, it must be a transparent film having a thickness sufficient to magnetically separate the first and second recording films 11 and 12 from each other without decreasing the optical power. Further, while multiple interference of light is effective in order to obtain a high read signal as described above, it involves appropriate conditions. The thickness of the transparent dielectric film 13 which satisfies such conditions is greater than or equal to 50 angstrom and smaller than or equal to 500 angstrom.

The first recording film 11 consists of three elements of Tb, Fe and Co as principal components while the second recording film 12 can be constructed using four elements including Gd in addition to the three elements as principal components. Although it is difficult to obtain a high threshold value for a magnetic field (a minimum magnetic field necessary to reverse the magnetization direction) only with the three elements of Tb, Fe and Co, the threshold value for a recording magnetic field can be made higher by adding Gd to the three elements.

In order to make the threshold value SH2 for a magnetic field of the second recording film 12 higher than the threshold value SH1 for a magnetic field of the first recording film 11 as much as possible, preferably the second recording film 12 is formed in a two-layer structure which includes a first layer made of four elements including Gd in addition to the three components as principal components and having a thickness greater than or equal to 50 angstrom but smaller than or equal to 200 angstrom and a second layer made of the three components of Tb, Fe and Co as principal components and having a thickness greater than or equal to 100 angstrom but smaller than or equal to 350 angstrom.

Using a magneto-optical recording medium having such a construction as described above, according to the present invention, magneto-optical recording is performed in the following manner. In particular, while light of predetermined power is irradiated upon the magneto-optical recording medium, one of three conditions including:

1. an initial condition wherein a magnetic field higher than the threshold value SH2 is applied in the same direction as the initial magnetization direction to magnetize the first and second recording films 11 and 12 in the same direction as the initial magnetization direction;
2. a first recorded condition wherein a magnetic field higher than the threshold valve SH1 but lower than the threshold value SH2 is applied in the opposite direction to the initial magnetization direction to magnetize only the first recording film 11 in the direction opposite to the initial magnetization direction; and
3. a second recorded condition wherein a magnetic field higher than the threshold value SH2 is applied in the direction opposite to the initial magnetization direction to magnetize both of the first and second recording films in the direction opposite to the initial magnetization direction, is selected to effect recording of three-value information.

With the magneto-optical recording medium and the magneto-optical recording method, by applying, while light is irradiated upon the magneto-optical recording medium from the first recording film 11 side, to the magneto-optical recording medium a magnetic field higher than the threshold value SH1 for a magnetic field of the first recording film 11 but lower than the threshold value SH2 for a magnetic field of the second recording film 12 in the direction (which may be hereinafter referred to positive direction of an application magnetic field) opposite to the initial magnetization direction, the magneto-optical recording medium can be put into the first recorded condition wherein only the magnetization direction of the first recording film 11 is reversed. Further, by applying, while light is irradiated similarly, to the magneto-optical recording medium a magnetic field higher than the threshold value SH2 for a magnetic field of the second recording film 13 in the direction opposite to the initial magnetization direction, the magneto-optical recording medium can be put into the second recorded condition wherein the magnetization directions of both of the first and second recording films 11 and 12 are reversed. On the other hand, by applying, while light is irradiated similarly, to the magneto-optical recording medium a magnetic field higher than the threshold value SH2 for a magnetic field of the second recording film 12 in the same direction (the direction may be referred to as negative direction of an application magnetic field) as the initial magnetization direction, the magneto-optical recording medium can be put back into the initial condition.

Figure 4:
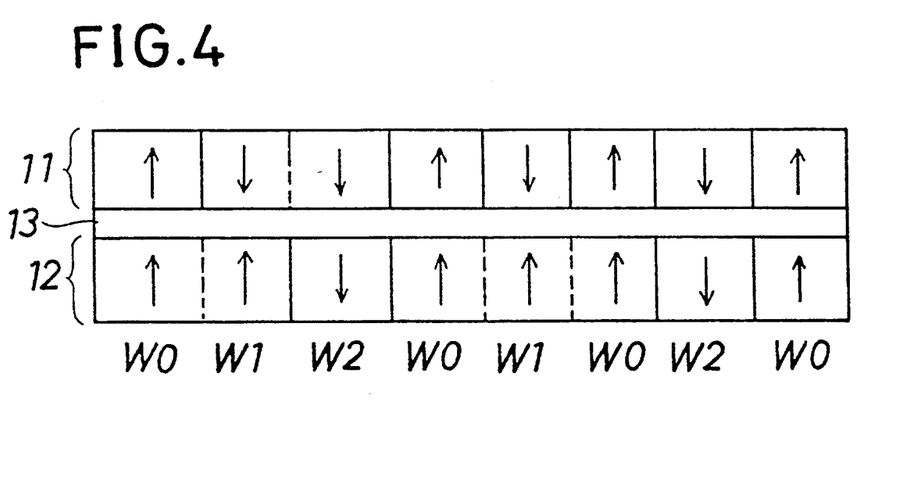
FIG. 4 is a schematic view illustrating selection among the initial condition and first and second recorded conditions of FIGS. 1 to 3 for individual pits.

In short, by selecting the amplitude of a magnetic field to be applied and the positive direction or the negative direction as the applied direction of the magnetic field, recording for each pit of three values including, as shown in FIG. 4, the initial condition W0 wherein the magnetization directions of the first and second recording films 11 and 12 are the same as the initial magnetization direction, the first recorded condition W1 wherein the magnetization only of the first recording film 11 is reversed to the initial magnetization direction, and the second recorded condition W2 wherein the magnetization directions of both of the first and second recording films 11 and 12 are reversed to the initial magnetization direction, can be realized. Besides, since any of the three conditions can be obtained with certainty by merely selecting the high or low amplitude of a magnetic field to be applied and selecting the positive or negative direction as the magnetization direction of the magnetic field to be applied, information to be written anew can be written irrespective of the preceding condition of a location at which it is to be recorded subsequently, and consequently, overwriting is allowed.

Read-out of the information recorded in such a manner as described above can be performed making use of a magnetic Kerr effect. In particular, since the magnitude of the Kerr rotation angle depends upon the magnetization direction and the magnitude of magnetization, the magnitudes of the Kerr rotation angles in the initial condition, the first recorded condition and the second recorded condition are different from one another, and accordingly, by setting the slide levels corresponding to the magnitudes of the Kerr rotation angles as respective read levels, the initial condition, the first recorded condition and the second recorded condition can be read out separately as information of three values.

Figure 5:
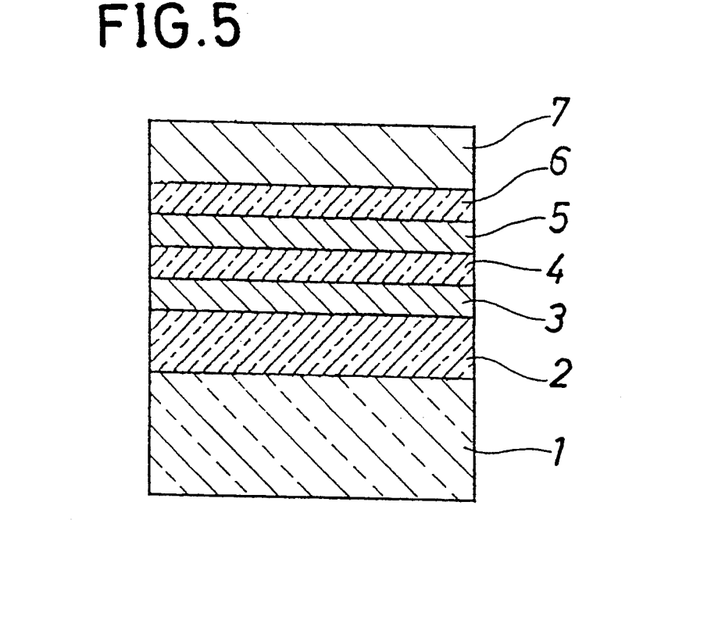
FIG. 5 is a cross sectional view of a magneto-optical recording disk showing a first preferred embodiment of the present invention.

Referring now to FIG. 5, there is shown in cross section a magneto-optical recording disk according to a first preferred embodiment of the present invention. The magneto-optical recording disk shown includes a transparent dielectric film 2, a first recording film 3, a transparent dielectric film 4, a second recording film 5, a transparent dielectric film 6 and a metal reflection film 7 successively layered on a polycarbonate substrate i which passes light. The three transparent dielectric films 2, 4 and 6 are made of $Si_3N_4$ and produced by reactive RF (radio frequency) sputtering. The first recording film 3 is a $Tb_{23}(Fe_{90}CO_{10})_{77}$ amorphous film and the second recording film 5 is a $Gd_{20}Tb_{10}(Fe_{80}CO_{20})_{70}$ amorphous film, and they are prepared DC magnetron sputtering. The metal reflection film 7 is made of Al and produced by DC sputtering. The materials and the thickness values of the films are listed in Table 1 below.

TABLE 1

| | Material | Thickness (angstrom) |
|---|---|---|
| Transparent Dielectric Film 2 | $Si_3N_4$ | 900 |
| First Recording Film 3 | $Tb_{23}(Fe_{90}Co_{10})_{77}$ | 100 |
| Transparent Dielectric Film 4 | $Si_3N_4$ | 200 |
| Second Recording Film 5 | $Gd_{20}Tb_{10}(Fe_{80}Co_{20})_{70}$ | 100 |
| Transparent Dielectric Film 6 | $Si_3N_4$ | 150 |
| Metal Reflection Film 7 | Al | 500 |

Figure 6:
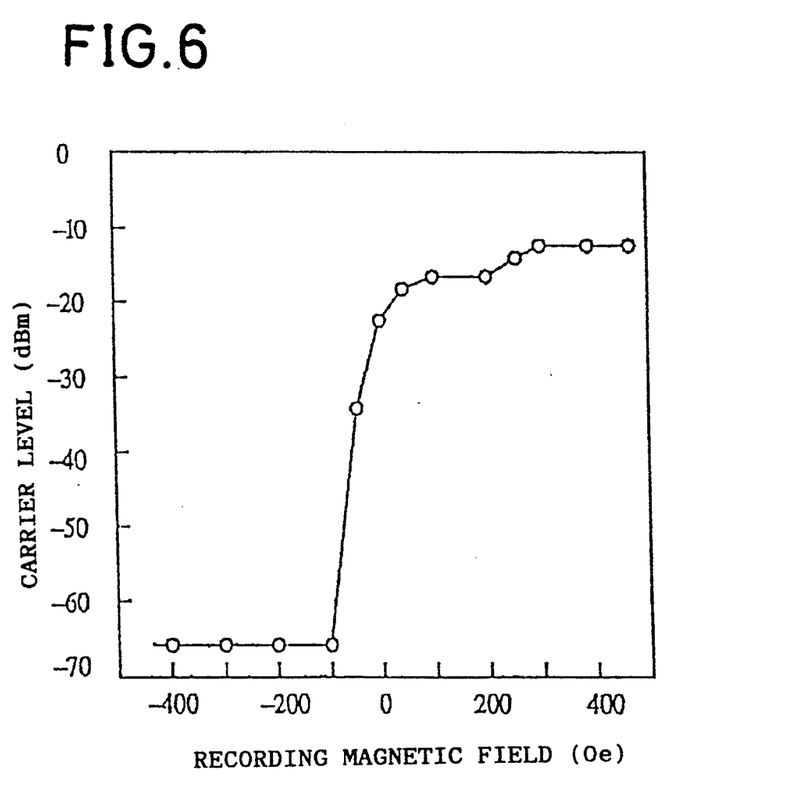
FIG. 6 is a characteristic diagram illustrating the magnetic field dependency of the carrier level of the magneto-optical recording disk of FIG. 5.

The magneto-optical recording disk of the first embodiment described above was produced actually, and the read/write characteristic of it was measured. The recording magnetic field dependency of the carrier level measured in the conditions of the disk rotation speed of 3,000 rpm, the linear velocity of 11 m/s, the recording frequency of 3.7 MHz and the recording power of 6 mW is illustrated in FIG. 6. The reading power is 1 mW. Referring to FIG. 6, the carrier level exhibits saturation in a range of the recording magnetic field of 100 to 200 oersted and another range higher than or equal to 300 oersted of the recording magnetic field. In this instance, there is a difference of about 6 dB between the carrier level in the range of the recording magnetic field of 100 to 200 oersted and the carrier level in the range of the recording magnetic field higher than or equal to 300 oersted, and the carrier level is higher in the range of the recording magnetic field higher than or equal to 300 oersted. Furthermore, in a further range of the recording magnetic field from 0 or so to 100 oersted in the negative direction, the carrier level drops rapidly, and where the recording magnetic field is higher than or equal to 100 oersted in the negative direction, the carrier level is saturated at a low fixed value. Consequently, when the recording magnetic field higher than or equal to 100 oersted in the negative direction is applied, no recording takes place. In short, the carrier level exhibits three stages in saturation condition.

Accordingly, the magneto-optical recording medium can be put into the first recorded condition W1 by applying a recording magnetic field within the range of 100 to 200 oersted in the positive direction; it can be put into the second recorded condition W2 by applying a recording magnetic field higher than or equal to 300 oersted in the positive direction; and it can be put back into the initial condition W0 from the first recorded condition W1 or the second recorded condition W2 by applying a recording magnetic field higher than or equal to 300 oersted in the negative direction. In short, three-value recording can be realized for each pit by selecting one of such three recording magnetic field applying conditions for the pit. Furthermore, since a reproduction output corresponding to the three-value recording can be obtained from each pit, three-value information can be reproduced only by setting slice levels corresponding to the reproduction outputs from the pits recorded with three-values.

Figure 7:
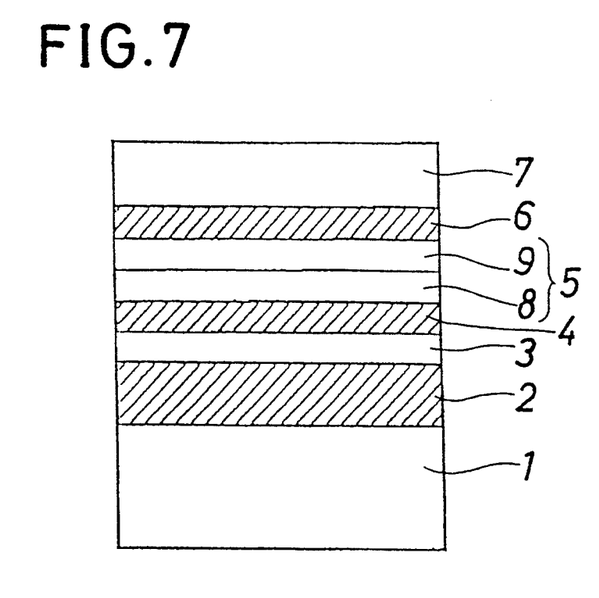
FIG. 7 is a cross sectional view of another magneto-optical recording disk showing a second preferred embodiment of the present invention.

Referring now to FIG. 7, there is shown in cross section another magneto-optical recording disk according to a second preferred embodiment of the present invention. The magneto-optical recording disk of the present embodiment is a modification to and is different from the magneto-optical recording disk of the preceding embodiment of FIG. 6 in that the second recording film 5 is constituted from first and second layers 8 and 9. The first layer 8 is a $Gd_{20}Tb_4(Fe_{80}CO_{20})_{76}$ amorphous film while the second layer 9 is a $Tb_{24}(Fe_{90}CO_{10})_{76}$ amorphous film, and they are prepared by DC magnetron sputtering. The materials and the thickness values of the films are listed in Table 2 below.

TABLE 2

| | Material | Thickness (angstrom) |
|---|---|---|
| Transparent Dielectric Film 2 | $Si_3N_4$ | 900 |
| First Recording Film 3 | $Tb_{23}(Fe_{90}Co_{10})_{77}$ | 100 |
| Transparent Dielectric Film 4 | $Si_3N_4$ | 250 |
| Second Recording Film 5 | | |

TABLE 2-continued

|  | Material | Thickness (angstrom) |
|---|---|---|
| First Layer | $Gd_{20}Tb_4(Fe_{80}Co_{20})_{76}$ | 100 |
| Second Layer | $Tb_{24}(Fe_{90}Co_{10})_{76}$ | 100 |
| Transparent Dielectric Film 6 | $Si_3N_4$ | 100 |
| Metal Reflection Film 7 | Al | 500 |

Figure 8:
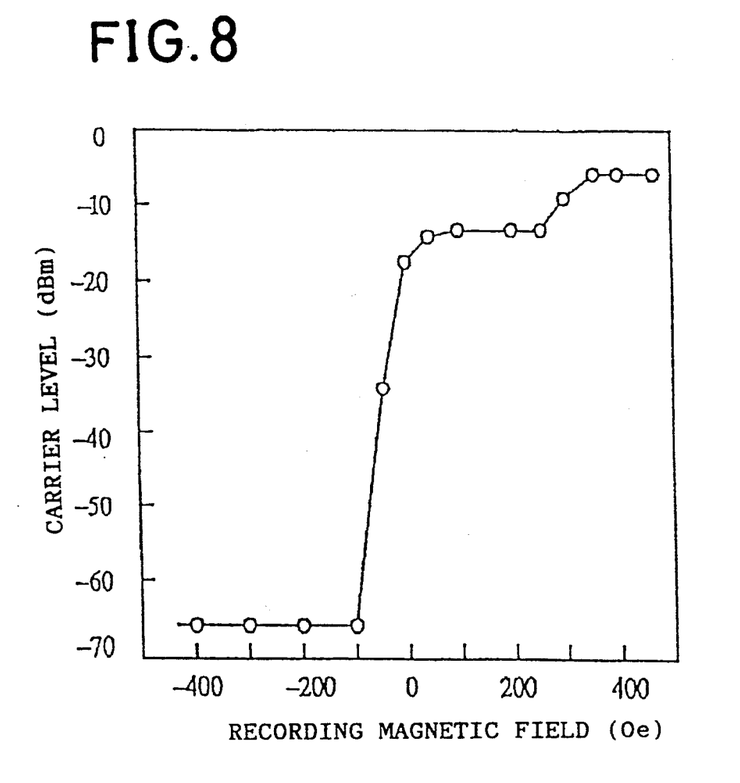
FIG. 8 is a characteristic diagram illustrating the magnetic field dependency of the carrier level of the magneto-optical recording disk of FIG. 7.

The magneto-optical recording disk of the second embodiment described above was produced actually, and the read/write characteristic of it was measured. The recording magnetic field dependency of the carrier level measured in the conditions of the disk rotation speed of 3,000 rpm, the linear velocity of 11 m/s, the recording frequency of 3.7 MHz and the recording power of 8 mW is illustrated in FIG. 8. The reading power is 1 mW. Referring to FIG. 8, the carrier level exhibits saturation in a range of the recording magnetic field of 100 to 250 oersted and another range higher than or equal to 350 oersted of the recording magnetic field. In this instance, there is a difference of about 8 dB between the carrier level in the range of the recording magnetic field of 100 to 250 oersted and the carrier level in the range of the recording magnetic field higher than or equal to 350 oersted, and the carrier level is higher in the range of the recording magnetic field higher than or equal to 350 oersted. Furthermore, in a further range of the recording magnetic field from 0 or so to 100 oersted in the negative direction, the carrier level drops rapidly, and where the recording magnetic field is higher than or equal to 100 oersted in the negative direction, the carrier level is saturated at a low fixed value. Consequently, when the recording magnetic field higher than or equal to 100 oersted in the negative direction is applied, no recording takes place.

Accordingly, the magneto-optical recording medium can be put into the first recorded condition W1 by applying a recording magnetic field within the range of 100 to 250 oersted in the positive direction; it can be put into the second recorded condition W2 by applying a recording magnetic field higher than or equal to 350 oersted in the positive direction; and it can be put back into the initial condition W0 from the first recorded condition W1 or the second recorded condition W2 by applying a recording magnetic field higher than or equal to 350 oersted in the negative direction. In short, three-value recording can be realized for each pit by selecting one of such three recording magnetic field applying conditions for the pit. Furthermore, reading of the recorded information can be realized similarly as in the first embodiment described above.

Also, a modified magneto-optical recording medium to the magneto-optical recording medium of the second embodiment was produced actually. In the modified magneto-optical recording medium, the materials used for the two layers 8 and 9 of the second recording film 5 were changed, and the first layer 8 was a $Gd_{26}(Fe_{30}Co_{20})_{74}$ amorphous film while the second layer 9 was a $Tb_{23}(Fe_{90}CO_{10})_{77}$ amorphous film. The materials and the thickness values of the films are listed in Table 3 below.

TABLE 3

|  | Material | Thickness (angstrom) |
|---|---|---|
| Transparent Dielectric Film 2 | $Si_3N_4$ | 900 |
| First Recording Film 3 | $Tb_{23}(Fe_{90}Co_{10})_{77}$ | 100 |
| Transparent Dielectric Film 4 | $Si_3N_4$ | 250 |
| Second Recording Film 5 | | |
| First Layer | $Gd_{26}(Fe_{80}Co_{20})_{74}$ | 100 |
| Second Layer | $Tb_{23}(Fe_{90}Co_{10})_{77}$ | 100 |
| Transparent Dielectric Film 6 | $Si_3N_4$ | 100 |
| Metal Reflection Film 7 | Al | 500 |

Figure 9:
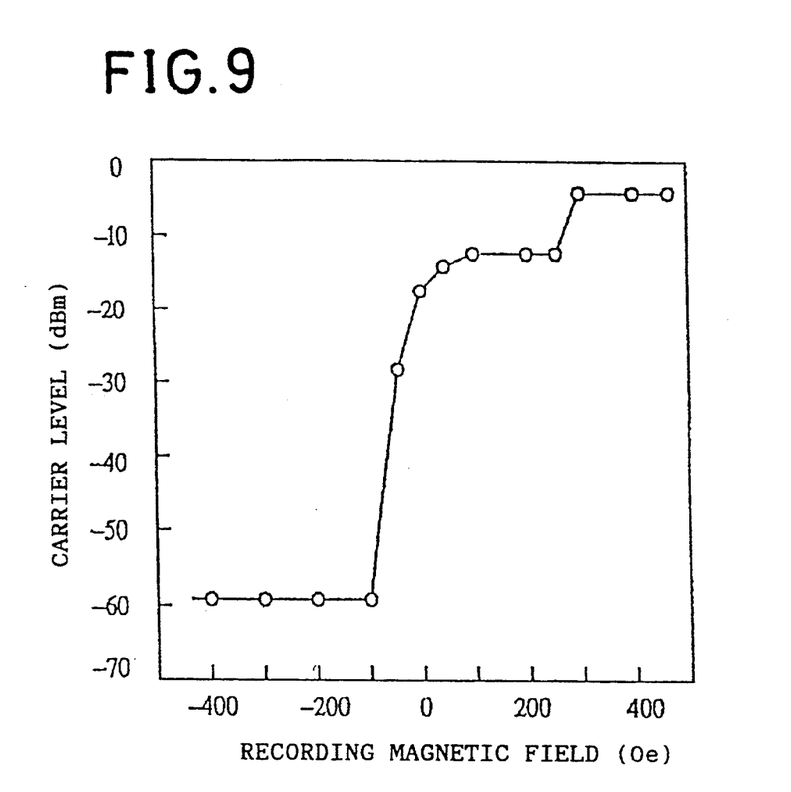
FIG. 9 is a similar view but illustrating the magnetic field dependency of the carrier level of a modified magneto-optical recording disk.

The read/write characteristic of the magneto-optical recording medium was measured in a similar condition as in the second embodiment described above, and the recording magnetic field dependency of the carrier level thus measured is illustrated in FIG. 9. Referring to FIG. 9, the carrier level exhibits saturation in a range of the recording magnetic field of 100 to 250 oersted and another range higher than or equal to 300 oersted of the recording magnetic field. In this instance, there is a difference of about 8 dB between the carrier level in the range of the recording magnetic field of 100 to 250 oersted and the carrier level in the range of the recording magnetic field higher than or equal to 300 oersted, and the carrier level is higher in the range of the recording magnetic field higher than or equal to 300 oersted. Furthermore, in a further range of the recording magnetic field from 0 or so to 100 oersted in the negative direction, the carrier level drops rapidly, and where the recording magnetic field is higher than or equal to 100 oersted in the negative direction, the carrier level is saturated at a low fixed value. Consequently, when the recording magnetic field higher than or equal to 100 oersted in the negative direction is applied, no recording takes place.

Accordingly, the magneto-optical recording medium can be put into the first recorded condition W1 by applying a recording magnetic field within the range of 100 to 250 oersted in the positive direction; it can be put into the second recorded condition W2 by applying a recording magnetic field higher than or equal to 300 oersted in the positive direction; and it can be put back into the initial condition W0 from the first recorded condition W1 or the second recorded condition W2 by applying a recording magnetic field higher than or equal to 300 oersted in the negative direction. Consequently, three-value recording can be realized for each pit. Furthermore, reading of the recorded information can be realized similarly as in the first and second embodiments described above.

It is to be noted that three-value recording can be realized similarly even if the relationship in arrangement between the first recording film 2 and the second recording medium 5 which has a higher threshold value for a recording magnetic field than the first recording film 2 is reversed in the vertical direction from those of FIGS. 5 and 7.

Having now fully described the invention, it will be apparent to one of ordinary skill in the art that many changes and modifications can be made thereto without departing from the spirit and scope of the invention as set forth herein.

What is claimed is:

1. A magneto-optical recording medium, comprising:
   a first transparent recording film in the form of a perpendicular magnetization layer;

a second transparent recording film in the form of a perpendicular magnetization layer;

a transparent dielectric film formed between said first and second recording films; and a substrate having said first recording film, said dielectric film and said second recording film formed in layers on an outer face thereof;

said first and second recording films being magnetized in a same initial magnetization direction in an initial condition of said magneto-optical recording medium;

said first recording film having a first threshold value for a recording magnetic field, which is a minimum magnetic field necessary to reverse the direction of magnetization, lower by a predetermined amount or more than a second threshold value for a recording magnetic field of said second recording film;

said first and second recording films being magnetized such that, while light of a particular power is irradiated upon said magneto-optical recording medium, when a magnetic field higher than the second threshold value is applied in the same direction as the initial magnetization direction, both of said first and second recording films are magnetized in the same direction as the initial magnetization direction; when a magnetic field higher than the first threshold value but lower than the second threshold value is applied in the direction opposite to the initial magnetization direction, only said first recording film is magnetized in the direction opposite to the initial magnetization direction; and when a magnetic field higher than the second threshold value is applied in the direction opposite to the initial magnetization direction, said first and second recording films are magnetized in the direction opposite to the initial magnetization direction.

2. A magneto-optical recording method for recording information onto a magneto-optical recording medium which includes first and second transparent recording films in the form of perpendicular magnetization layers layered with each other with a transparent dielectric film interposed therebetween, said first and second recording films being magnetized in a same initial magnetization direction in an initial condition of said magneto-optical recording medium, said first recording film having a first threshold value for a recording magnetic field, which is a minimum magnetic field necessary to reverse the direction of magnetization, lower by a predetermined amount or more than a second threshold value of said second recording film, comprising the steps of:

irradiating light of a particular power upon said magneto-optical recording medium; and applying, while such irradiation continues, a magnetic field to said magneto-optical recording medium to effect recording of three-value information such that, when the magnetic field is higher than the second threshold value and is applied in the same direction as the initial magnetization direction, said magneto-optical recording medium is magnetized in the initial condition wherein both of said first and second recording films are magnetized in the same direction as the initial magnetization direction; when the magnetic field is higher than the first threshold value but lower than the second threshold value and is applied in the direction opposite to the initial magnetization direction, said magneto-optical recording medium is magnetized in a first condition wherein only said first recording film is magnetized in the direction opposite to the initial magnetization direction; and when the magnetic field is higher than the second threshold value and is applied in the direction opposite to the initial magnetization direction, said magneto-optical recording medium is magnetized in a second condition wherein said first and second recording films are magnetized in the direction opposite to the initial magnetization direction.

* * * * *

UNITED STATES PATENT AND TRADEMARK OFFICE
CERTIFICATE OF CORRECTION

PATENT NO. : 5,359,579

DATED : October 25, 1994

INVENTOR(S) : KARUBE

It is certified that error appears in the above-identified patent and that said Letters Patent is hereby corrected as shown below:

Col. 7, line 44, delete "i" and insert --1--.

Signed and Sealed this

Fourteenth Day of February, 1995

Attest:

BRUCE LEHMAN

Attesting Officer — Commissioner of Patents and Trademarks